United States Patent [19]

Shoup

[11] 3,736,401

[45] May 29, 1973

[54] THROUGH DECK WELDING
[75] Inventor: Thomas E. Shoup, Amherst, Ohio
[73] Assignee: TRW Inc., Cleveland, Ohio
[22] Filed: July 9, 1970
[21] Appl. No.: 53,368

[52] U.S. Cl. ................................................219/98
[51] Int. Cl. ..............................................B23k 9/20
[58] Field of Search...........................219/74, 98, 99

[56] References Cited

UNITED STATES PATENTS 2,790,066  4/1957  Haynes et al..........................219/98
2,491,479  12/1949  Dash ....................................219/98
2,315,502  4/1943  Crecca et al. ........................219/98

Primary Examiner—R. F. Staubly
Attorney—Allen D. Gutchess, Jr.

[57] ABSTRACT

This invention is directed at a drawn-arc welding gun with means for providing a rotary flow of air, or stream of fluid, around the weld area. This invention is also directed at ferrules which are designed to enhance movement of air or fluid around the weld area.

3 Claims, 10 Drawing Figures

Patented May 29, 1973

INVENTOR
THOMAS E. SHOUP
BY
*Gordon Needleman*
ATTORNEY

INVENTOR
THOMAS E. SHOUP
BY
Gordon Needleman
ATTORNEY

Patented May 29, 1973 3,736,401

INVENTOR
THOMAS E. SHOUP
BY
Gordon Needleman
ATTORNEY

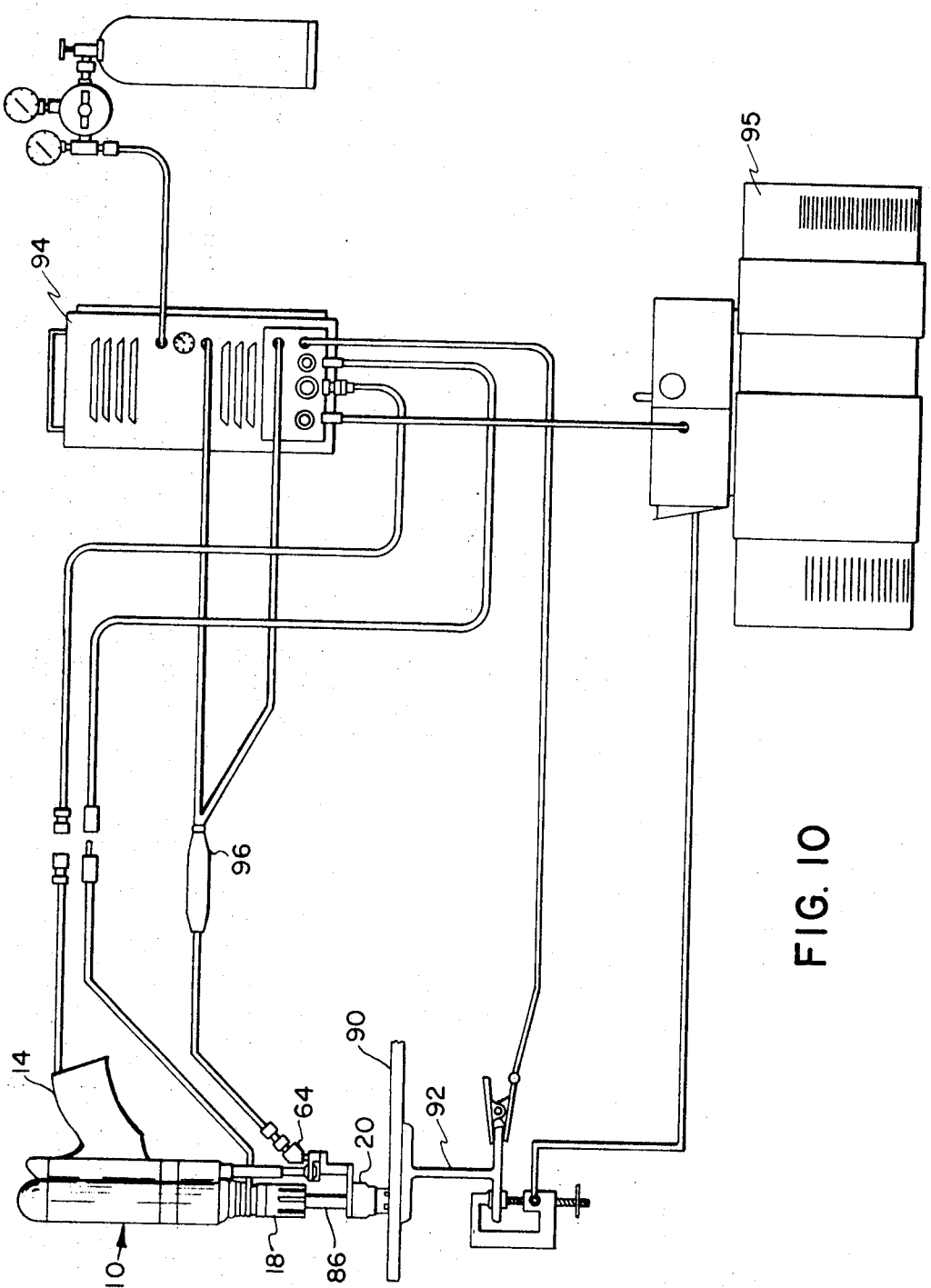

THROUGH DECK WELDING

BACKGROUND OF THE INVENTION

1. Field of the Invention

This invention is directed at a drawn-arc welder for welding a stud to a steel beam through a galvanized steel sheet. Heretofore, it has been extremely difficult if not impossible to weld this assembly satisfactorily. Although some welds have been made, they were entirely unsatisfactory for many reasons. One of the reasons that the weld is unsatisfactory is that zinc has a lower boiling point than steel and is still in the gaseous state as the steel solidifies. If the gas is entrapped by the solidifying steel, it remains within the weld metal deposit as porosity. The volatilized zinc also causes the welding arc to be very unstable and erratic thereby causing expulsion of weld metal from the weld area.

2. Description of Prior Art

The patents to Browning, U. S. Pat. No. 3,204,075 and U. S. Pat. No. 3,204,076 indicate the use of air at the operating end of the electric arc torch of the plasma forming gas type. The Browning patents disclose that the air is used to remove molten material and slag produced by the heat and to clean the inner surface of the shell 20.

The patent to Herring, Jr., U. S. Pat. No. 3,324,277 discloses the use of air at the operating end of a plasma torch to control the depth of a cut groove and to remove the molten metal from groove.

The patent to Burgman, U. S. Pat. No. 1,716,614 and patents cited in column 1 thereof disclose the use of gases other than air around the weld site to increase dutility of the weld. See also the patent to Hobart, U. S. Pat. No. 1,746,081.

None of the cited patents disclose the use of air in a stud welding operation or in welding through galvanized steel sheet.

SUMMARY OF THE INVENTION

An object of the present invention is to provide an improved welding gun for welding a stud to a beam through galvanized sheet steel.

Another object of the present invention is to provide the use of a stream of air or gas near the beginning and through a portion of the drawn-arc welding cycle thereby improving the weld between a stud and a beam through galvanized sheet steel.

Another object of the preset invention is to provide ferrule designs which will direct the air or gas in a swirling path over the weld area.

A further object of the present invention is to provide a ferrule utilizing a serated surface at one end and having cone-shaped grooves proximate the other end to enable the air or gas to flow into the weld area.

BRIEF DESCRIPTION OF THE DRAWINGS

FIG. 10 is a diagrammatic representation of the welding gun with all accessory connections showing a control unit, a power unit and the solenoid valve.

DESCRIPTION OF THE PREFERRED EMBODIMENT

Figure 1:
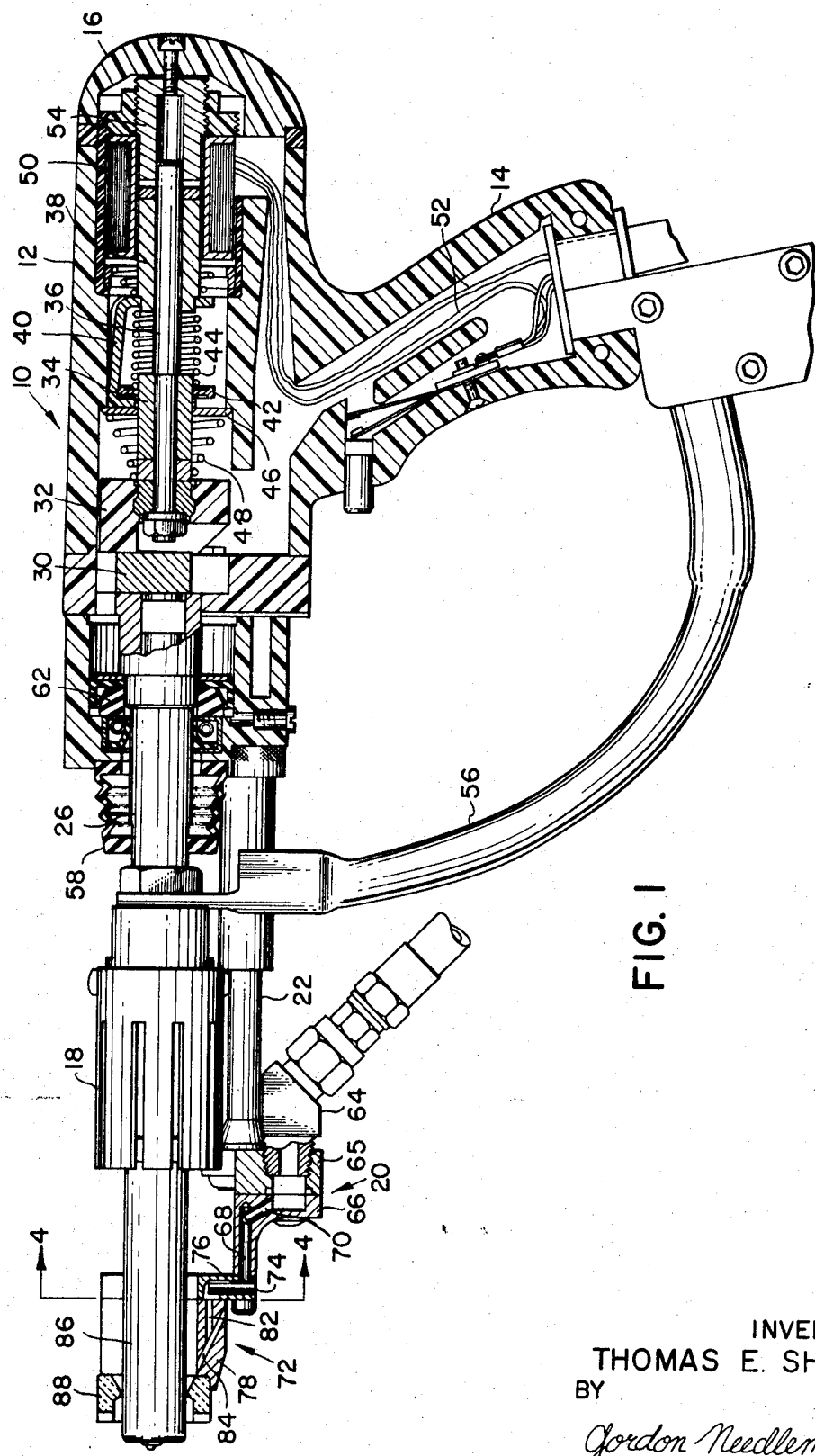
FIG. 1 is a section of a welding gun showing the new operating end.
Figure 2:
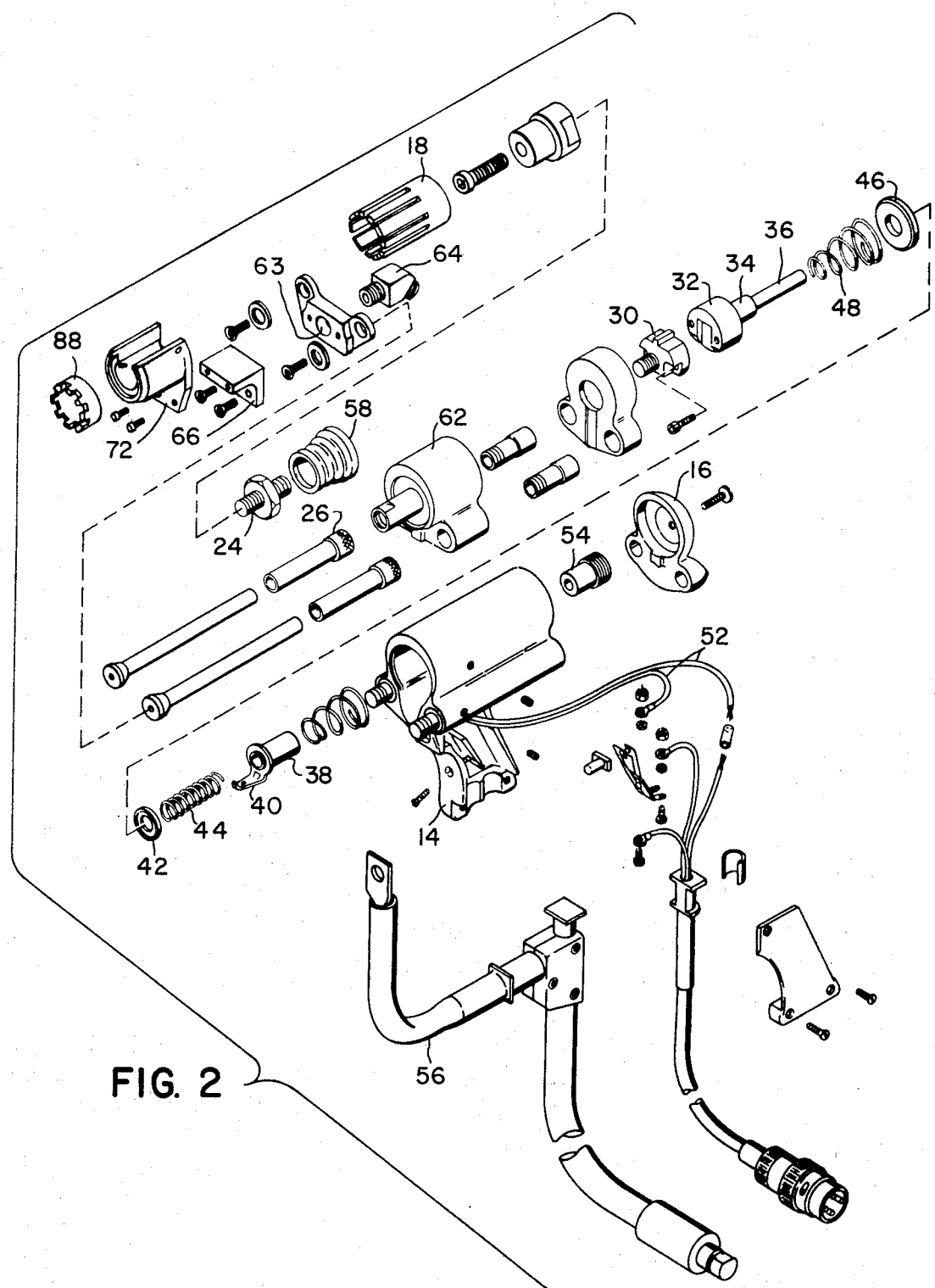
FIG. 2 is an exploded view of the welding gun shown in FIG. 1.
Figure 3:
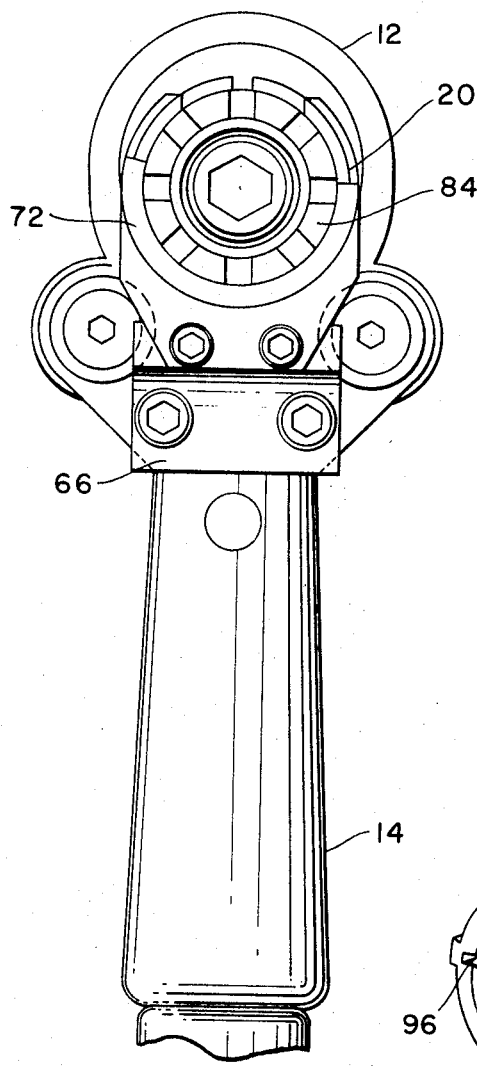
FIG. 3 is a front elevation of the gun shown in FIG. 1.
Figure 4:
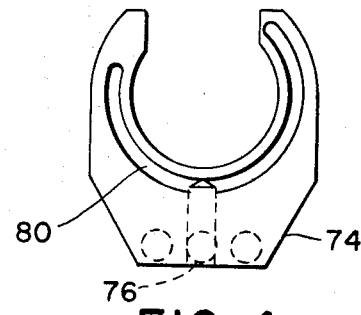
FIG. 4 is a top plan view of the base of the air foot.

The basic welding tool can be any of a number of suitable types. Where the stud is to be welded by the drawn-arc method, the tool must include means for retracting the stud from the workpiece and means for moving the stud toward and against the workpiece. Means are also provided for holding the stud in a retracted position until it is again moved toward and against the workpiece. The welding tool 10 includes a main body or housing 12 of a dielectric material. The body 12 has an integral pistol grip 14 and a separable rear end cap 16. A stud holder or chuck 18 is located at the front of the tool and holds a stud during the welding operation. A ferrule holder assembly 20 lies in front of the chuck 18 and is adjustably supported by two legs 22. The chuck 18 is attached to a chuck leg 24, which in turn is attached to a piston shaft 26 which is attached to the intermediate portion 30.

Attached to the intermediate portion 30 is a rod holding element 32, which is integral with a cylindrical lift rod 34 having a cylindrical smaller diameter guide rod 36 extending rearwardly therefrom through a movable core 38.

A lifting hook 40 is attached to the movable core 38 and is positioned to engage a lifting ring 42 when moved rearwardly by the movable core 38. The ring 42 has an inner diameter slightly exceeding the outer diameter of the lift rod 34 and the ring 42 is maintained in a perpendicular position to the axis of the rod holding element 32 by a lifting ring 42 against a stop plate 46 that is held in place by set screws. The lifting rod assembly is held in the forward position by a return or plunge spring 48. In this position the lifting ring 42 is free of the lift rod 34 which can move rearwardly therethrough when the stud and the chuck 18 are moved from an extended position to a position slightly removed from the initial welding position at the time the stud is pressed against the workpiece. This initial welding position may vary slightly for variations in the length of the stud held by the chuck. When the lifting hook 40 engages the lifting ring 42, the ring moves to a position in which it engages the lifting rod 34 and retracts it to a fully retracted position when the core 38 moves toward the rear. In this manner the stud and the chuck will be retracted a predetermined distance even though the length of the stud in the chuck may differ from the lengths of other studs.

The movable core 38 is retracted when current is supplied to a solenoid coil 50 through suitable leads 52 in a manner well known in the art. The rearward movement of the core 38 which determines the extent of the lift of the stud and the chuck is limited by an adjustable core piece 54 which can be turned toward or away from the movable core 38 to vary the length of the lift stroke.

A terminal of the main welding cable 56 is engaged to the chuck leg 24 to hold the terminal against the chuck 18. The other end of the chuck leg 24 engages the piston shaft 26 of the plunge damper assembly 62. A rubber bellows 58 protects the piston shaft 26. An externally threaded stud extends from the intermediate portion 30 for engaging the plunge damper assembly 62. The intermediate portion 30 is also engaged to the rod holding element 32.

The ferrule holder assembly 20 includes a foot bracket 65 which has an internally threaded hole 63 having threads engaged to an externally threaded element 64 which in turn can be connected to a fluid line for accepting air, oxygen or other appropriate fluids. The threaded hole 63 extends through the bracket 65 and opens into a counter bore in a right angle support 66. The counter bore is formed through the first leg of the right angle support 66 and a passage 68 is formed through the second leg of the right angle support 66 which is joined by a channel 70 completing the system. The air foot 72 is formed of two pieces, an arced cover having a base 74 including an air hole 76 which mates with the passage 68 and acts as a continuation thereof, and a C-shaped ferrule holder 78. The air hole 76 opens into a plenum chamber 80 in the upper portion of the cover which has three inlet channels 82 extending therefrom opening into three cross-drilled aspiration channels 84 which extend from the outer surface of the ferrule holder to the inner area thereof. The aspiration channels 84 are of larger diameter than the inlet channels 82 causing a quantity of air to be sucked down therethrough keeping the oxygen from escaping back up the aspiration channels 84. The aspiration channels 84 can also be used for passing a brush therethrough for easy cleaning. The aspiration channels 84 are in angular relation to the axis of the gun thereby providing a swirling or cyclonic effect to the air streams.

A stud 86 is loaded into the chuck 18 and a ferrule 88 is inserted in the C-shaped ferrule holder 78 with the stud 86 extending through the ferrule 88. The ferrule 88 is a ring shaped ceramic element having a chamfered edge at one end and a serrated edge at the other. The chamfered edge of the ferrule 88 allows the gases to circle around the weld area of the stud 86 and the serrations allow the gases and contaminants to be expelled from the weld area. To start the weld cycle, the gun is placed against the workpiece which comprises a strip of galvanized steel 90 on a steel beam 92 and the trigger is depressed activating the control unit 94 from power supplied by the power unit 95. The control unit 94 includes a circuit which causes the stud 86 to be lifted from the workpiece and another circuit which causes a solenoid valve 96 to open allowing air or other gas to be directed into the weld area through the hole 63 in the bracket 65 thence through the channel 70 and the passage 68 in the right angle support 66; then through the air hole 76 into the plenum chamber 80, out the ferrule holder inlet channel 82 and finally through the aspiration channel 84 to the weld area. After a predetermined time, an adjustable timing circuit in the control unit 94 causes the solenoid valve 96 to shut off and the weld cycle continues in a manner known in the art.

Figure 5:
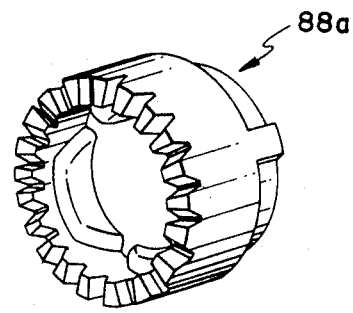
FIG. 5 is a front perspective of a modified form of the ferrule.
Figure 6:
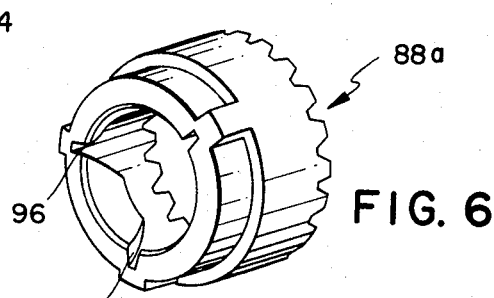
FIG. 6 is a rear perspective of a modified form of the ferrule.
Figure 7:
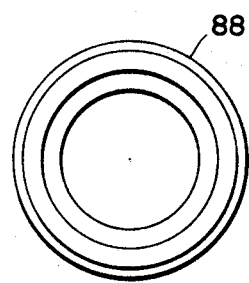
FIG. 7 is a top plan view of the ferrule shown in FIG. 2.
Figure 9:
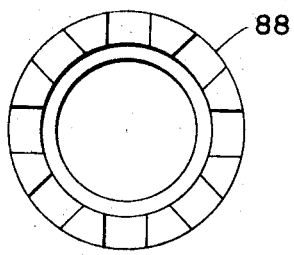
FIG. 9 is a bottom plan view of the ferrule shown in FIG. 7.
Figure 8:
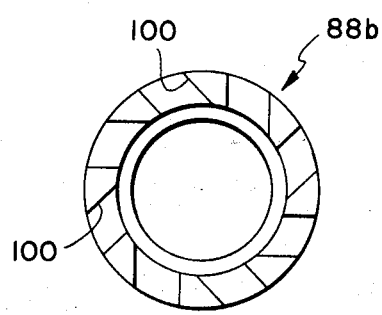
FIG. 8 is a bottom plan view of another modified form of the ferrule.

Another type of ferrule 88a is shown in FIGS. 5 and 6, comprising a ring like ceramic element having one edge serrated into a saw-tooth configuration and the other edge with three entry ports 98 formed 120° from each other. Each of the ports 98 open into a cone-shaped channel whose apex terminates in the port.

Another type of ferrule 88b has one edge which is chamfered and the other edge which is serrated. Each of the serrations has a surface 100 in angular relation to the axis of the ferrule thereby aiding the circular movement of the air stream.

With reference to the foregoing description it is to be understood that what has been disclosed herein represents an embodiment of the invention and is to be construed as illustrative rather than restrictive in nature and that the invention is best described by the following claims:

1. In a stud welding tool for welding a stud to a workpiece by a drawn arc, the tool comprising a chuck for holding a stud, means for retracting the chuck, means for supplying welding current to the chuck after movement of the chuck to the retracted position, and means for plunging the chuck forwardly toward the workpiece after a period of time in the retracted position and a ferrule holder assembly defining an area and including a foot having a hole formed therein, a plenum chamber into which the hole opens, and a series of inlet channels opening into the plenum chamber, and the ferrule holder assembly including aspiration channels which open into the area defined by the ferrule holder assembly and which open into the area exterior of the ferrule holder assembly at points on the periphery of the ferrule holder assembly and each of the aspiration channels connected to an inlet channel.

2. A stud welding tool as set forth in claim 1 wherein the aspiration channels are of larger diameter than the inlet channels.

3. A stud welding tool as set forth in claim 2 wherein the aspiration channels are in angular relation to the axis of the ferrule holder assembly.

* * * * *